Dec. 26, 1944.  C. M. ASBILL, JR., ET AL  2,365,793
COTTON-WORKING MACHINE
Filed July 17, 1943  6 Sheets-Sheet 1

INVENTORS
C. M. ASBILL JR.
R. C. YOUNG
BY
ATTORNEYS

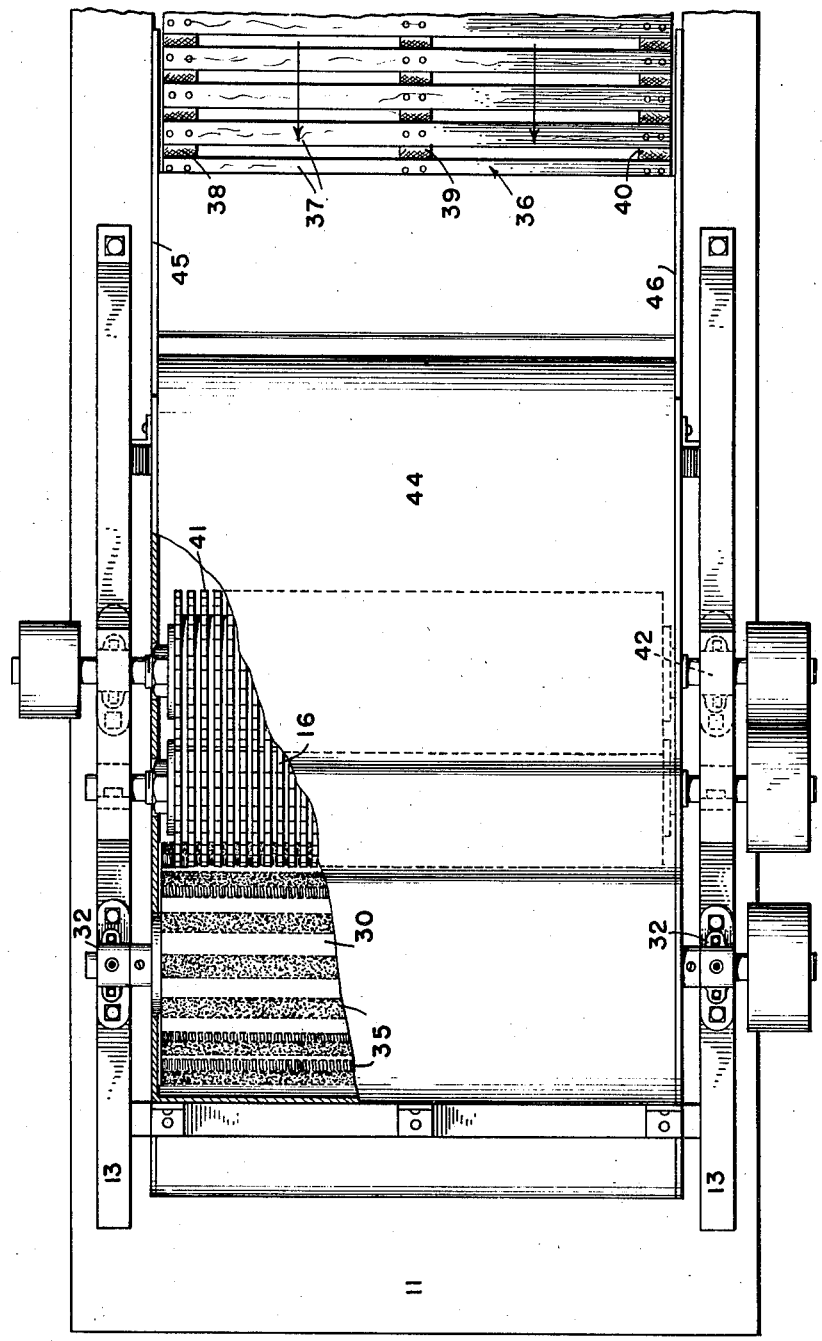

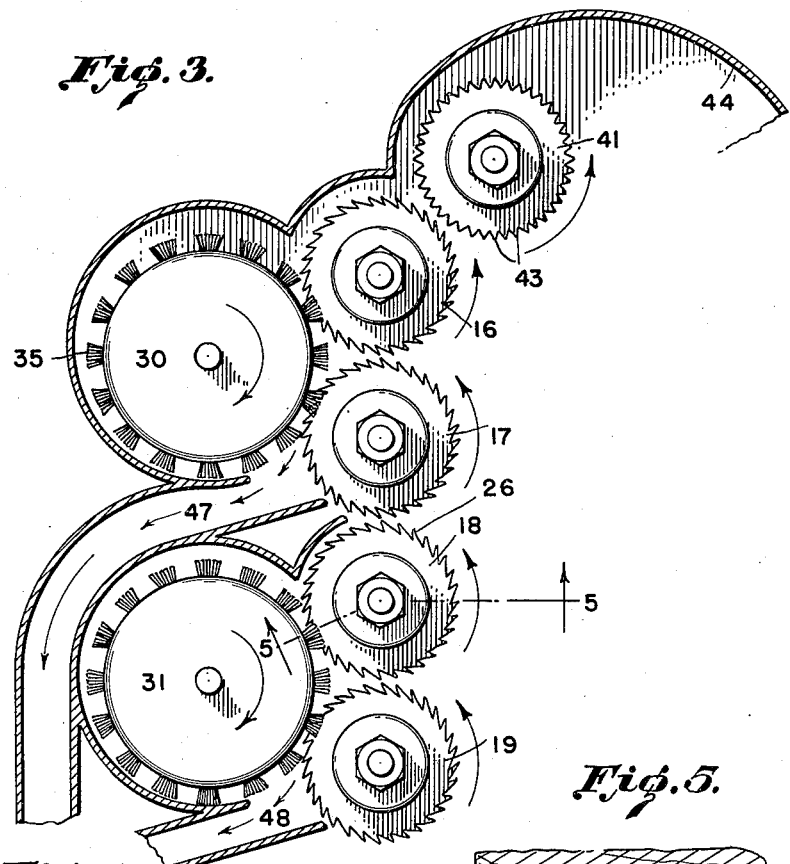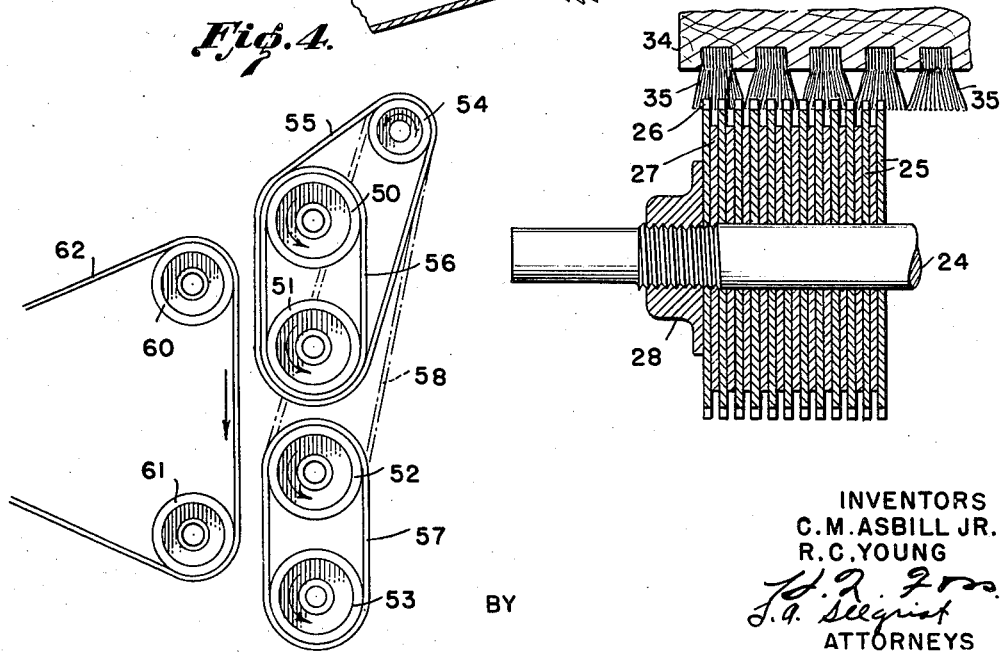

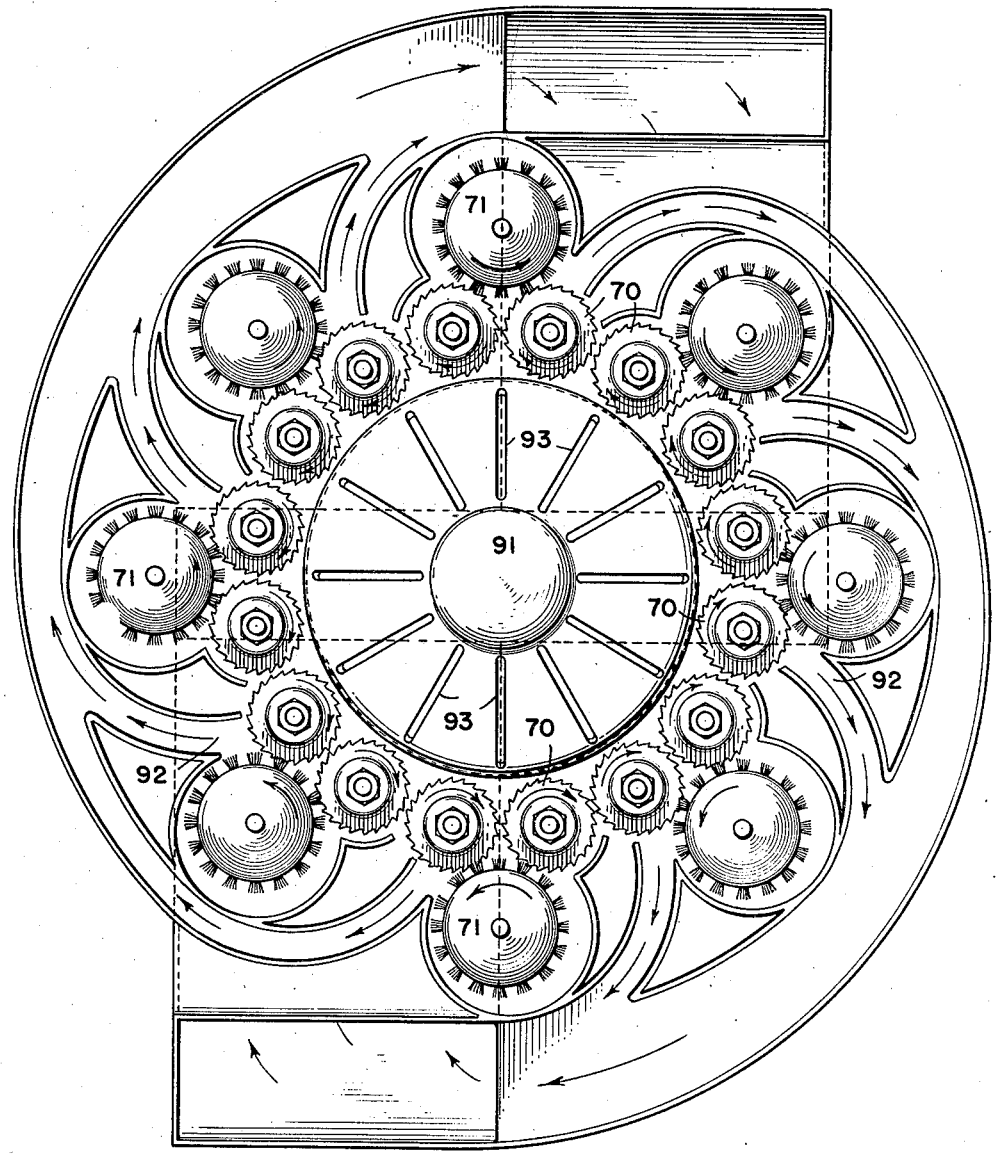

Dec. 26, 1944. C. M. ASBILL, JR., ET AL 2,365,793
COTTON-WORKING MACHINE
Filed July 17, 1943 6 Sheets-Sheet 5
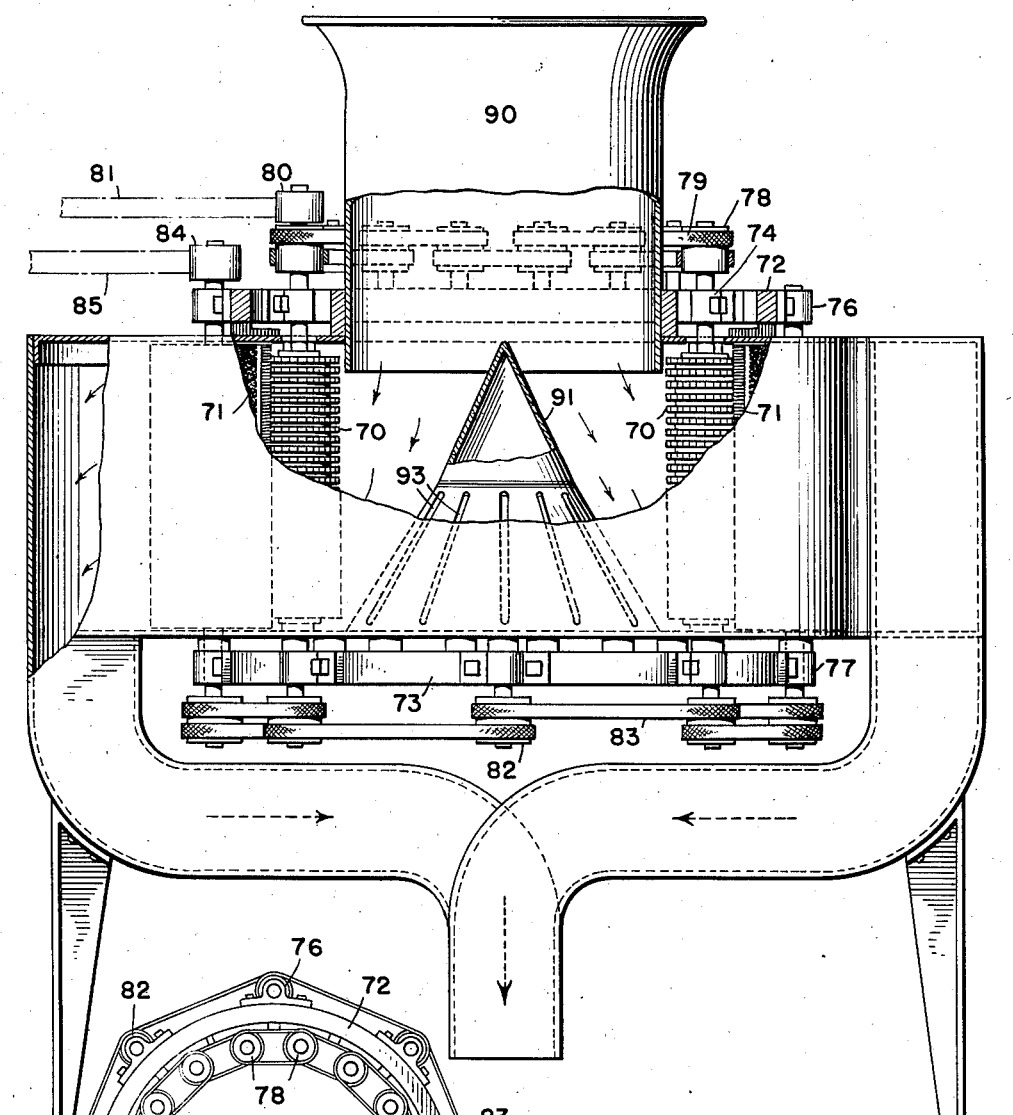
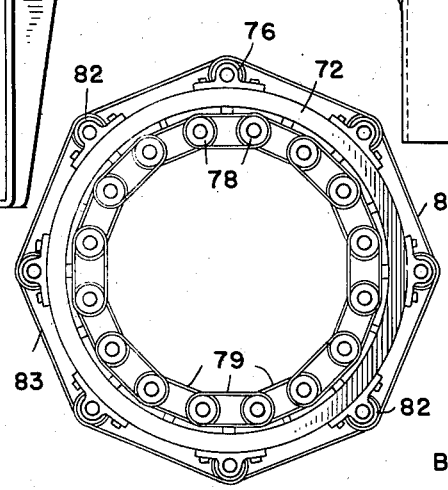
INVENTORS
C. M. ASBILL JR.
R. C. YOUNG
BY
ATTORNEYS Dec. 26, 1944.   C. M. ASBILL, JR., ET AL   2,365,793
COTTON-WORKING MACHINE
Filed July 17, 1943     6 Sheets-Sheet 6

INVENTORS
C. M. ASBILL JR.
R. C. YOUNG
BY
ATTORNEYS

Patented Dec. 26, 1944

2,365,793

UNITED STATES PATENT OFFICE 2,365,793

COTTON-WORKING MACHINE

Clarence M. Asbill, Jr., New Orleans, La., and Ray C. Young, Leland, Miss., assignors to Claude R. Wickard, as Secretary of Agriculture of the United States of America, and his successors in office Application July 17, 1943, Serial No. 495,205

3 Claims. (Cl. 19—93)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to a cotton-working machine, and has among its objects the provision of a machine which will break up large lumps of cotton into finely divided lint; which will feed the lint at a relatively uniform rate into a lint flue conveyor in a simple manner; which will remove trash and other foreign matter from the lumps of cotton; and such other objects as will be apparent from the following description, appended claims, and annexed drawings, in which:

Figure 2 is a view looking downward on the machine with parts broken away;

Figure 3 is a fragmentary section, showing the operation of the internal parts;

Figure 4 is a diagram showing a belting system for operating the machine;

Figure 5 is a fragmentary section on the line 5—5 of Figure 3;

Figure 6 is a view looking downward on another embodiment of the machine with certain parts removed;

Figure 7 is an elevation of the machine shown in Figure 6, with parts broken away;

Figure 8 is a diagram showing a belting system for operating the machine in the embodiment of Figures 6 and 7.

Figure 1:
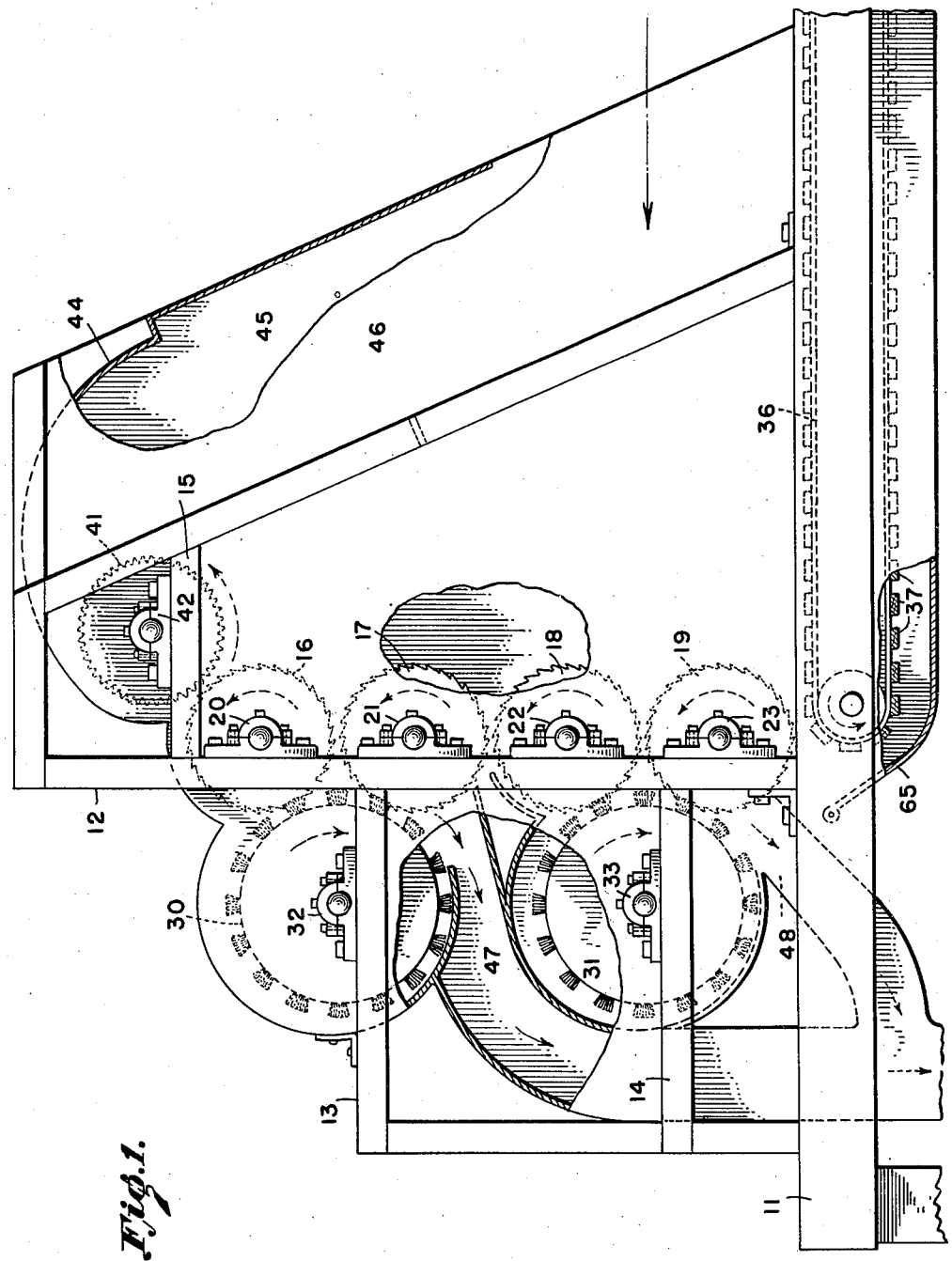
Figure 1 is a fragmentary side elevation of the machine with some parts broken away and others removed for purposes of illustration.

Referring to the embodiment of Figures 1 through 5, in particular, the machine comprises a suitable frame having a base 11 on each side of which is rigidly mounted an upright 12 and horizontal bars 13, 14, and 15.

A number of toothed-cylinders 16, 17, 18, and 19 are rotatably mounted in pairs of pillar-blocks 20, 21, 22, and 23, fixed to the uprights 12. Each toothed-cylinder comprises essentially a shaft 24 on which a number of discs 25, each provided with peripheral saw-shaped teeth 26 inclined toward the direction of rotation of the cylinders, are mounted, axially spaced by spacing discs 27, and held assembled on the shaft by clamping nuts 28.

Brush-cylinders 30 and 31 are rotatably mounted, with their axes of rotation parallel with the axes of rotation of the toothed-cylinders, in pairs of pillar-blocks 32 and 33 fixed to the horizontal bars 13 and 14, respectively. Each brush-cylinder comprises a cylindrical body 34 with brush-bristles 35 secured on its periphery. One brush-cylinder is provided for each pair of adjacent toothed-cylinders, and is so mounted that the brush-bristles engage between the teeth of both adjacent toothed-cylinders to a slight depth.

Means for conveying lumps of cotton into the machine to bring them into contact with the toothed-cylinders is provided by an endless feed-belt 36, formed from spaced-apart slats 37 fixed to flexible beltings 38, 39, and 40. The lumps of lint cotton may be fed onto the feed-belt from a suitable hopper (not shown) placed above the belt at the right hand end of Figure 1.

The toothed-cylinders are all driven in the same direction, as shown by the arrows in Figure 1. As a lump of cotton is carried against the lowermost toothed-cylinder 19, the lump is contacted by the teeth and carried upward until it contacts the teeth on the next higher toothed-cylinder, which, in turn, carries it upward. Each toothed-cylinder picks a thin layer of cotton lint from the lump and carries the lint around between the teeth. When the lump reaches the upper toothed-cylinder, it is carried against a kicker 41, which is rotatably mounted in a pair of pillar-blocks 42 fixed to the horizontal bars 15. The kicker is quite similar in structure to the toothed-cylinders and rotates in the same direction. The kicker teeth 43 are, however, not inclined forwardly, as in the case of the cylinder teeth, and, consequently, when the lump reaches the kicker it is thrown into contact with a curved deflector plate 44, forming a ceiling for the machine, and is then directed back onto the feed-belt. The deflector plate extends downwardly toward the feed-belt, leaving an opening between its termination and the feed-belt through which the cotton enters the machine. Due to the motion of the toothed-cylinders, kicker, and feed-belt, a large roll of lumpy cotton continuously rotates in the machine under the deflector plate and between suitable side panels 45 and 46. The feed-belt continuously adds lumps of cotton to replace the cotton removed as lint.

As the toothed-cylinders continuously pick a thin layer from the surface of the roll, the picked cotton lint is continuously removed from between the teeth by the brush-cylinders, which are rotated in the direction opposite to that of the toothed-cylinders and at a greater speed. This results in a wiping action of the brush-bristles between the teeth, the relative motion between the teeth and bristles being in the direction to prevent cutting of the bristles by the teeth. The brush-cylinders are encased in the manner shown and are provided with outgoing lint flues 47 and 48.

The brush-cylinders, because of their rapid rotation, encasement, and position of the lint flues, act as fans, creating sufficient air current to deliver the lint through an air blast conveyor flue to a farther point of destination without the use of additional fans, if the back pressure is not too great.

A suitable belting means for rotating the parts is illustrated in Figure 4, in which the toothed-cylinder shafts are provided on their projecting ends on one side of the machine with pulleys 50, 51, 52, and 53, and the kicker shaft with a pulley 54. Belts 55, 56, and 57 are belted over these pulleys in the manner illustrated. On the opposite side of the machine, the kicker is provided with a pulley, and a belt 58 is belted over it and another pulley on the shaft of either of the two lower toothed-cylinders. The toothed-cylinders and kicker are thus all driven together in the same direction. Power for driving them may be furnished by any suitable means, such as an additional pulley fixed to any of the shafts and driven by a variable speed motor (not shown). The brush-cylinders, which are rotated by power means, such as another variable speed motor (not shown), independently of the means for driving the toothed-cylinders, are also provided with pulleys 60 and 61 fixed to their shafts on one side of the machine, over both of which the power belt 62 is belted.

Any other suitable arrangement for driving the parts may be used. However, rotation of the toothed-cylinders independently of the brush-cylinders, by variable speed means for each, provides a fine degree of regulation of the machine. As shown, the toothed-cylinders are all driven at the same speed, but by varying the size of the pulleys their speeds may be progressively increased from the lower to the higher ones.

The cotton lumps, as they are taken from the baled cotton and fed into the machine, contain some foreign materials, such as sticks, leaves, and so forth. These are loosened from the lumps and thrown back onto the conveyor belt. Due to the spaced slatted arrangement, the belt is perforated, and such foreign material, if in small pieces, falls through the perforations and is collected in a trough 65. Larger pieces are carried over the end of the belt and also fall into the trough. The collected debris may be removed from the trough at regular intervals.

Referring to Figures 6 through 8, the embodiment shown functions in general the same as that shown in Figures 1 through 5. The toothed-cylinders 70 and brush-cylinders 71 are, however, in this embodiment positioned vertically, with their axes of rotation positioned substantially on the circumferences of circles. Upper and lower ring-shaped frame members 72 and 73 carry pillar-blocks 74 on their inner surfaces in which the shafts of the toothed-cylinders are journaled, and carry pillar-blocks 76 and 77, respectively, on their outer surfaces for rotatably receiving the shafts of the brush-cylinders. The toothed-cylinders are all rotated in the same direction by pulleys 78 attached to the upper projecting ends of their shafts and having belts 79 belted on them in the manner illustrated. Power is supplied to the toothed-cylinders by means of a power pulley 80 fixed on one of the toothed-cylinder shafts and a drive belt 81 coupling the power pulley with a suitable variable speed motor (not shown). The brush-cylinders are all rotated in the opposite direction to the direction of rotation of the toothed-cylinders and at a greater speed by pulleys 82 attached to the lower projecting ends of the brush-cylinder shafts and having belts 83 belted on them. Power is supplied to the brush-cylinders by means of a power pulley 84 fixed to one of the brush-cylinder shafts and a drive belt 85 coupling the power pulley with another variable speed motor (not shown).

Lumpy cotton is fed into the machine within the cylindrical space between the toothed-cylinders through the hopper 90. A vertically positioned cone-shaped member 91, located within the space, serves to direct the lumps of cotton into contact with the toothed-cylinders and a roll of lumpy cotton is continuously whirled in the machine, with its outer surface held in contact with the toothed-cylinders by centrifugal force.

Lint cotton is brushed from between the teeth by the brush-cylinders and blown into lint flues 92 in a manner similar to that described in reference to the first embodiment.

Apertures 93 provided in the lower portion of member 91 allow egress of any debris contained in the lump cotton, which debris may be collected in any suitable container (not shown) positioned underneath the machine, or it may be allowed to collect on the floor and be removed at will.

Figure 9:
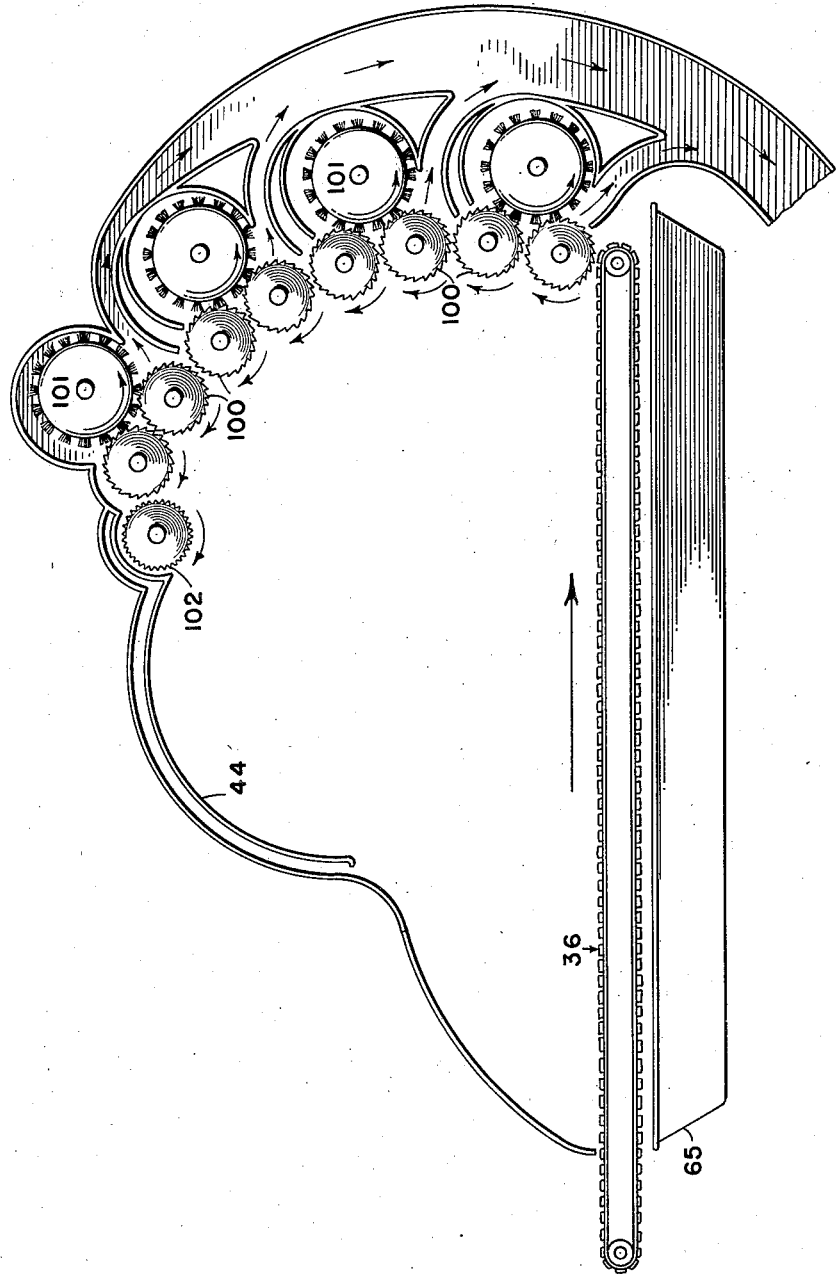
Figure 9 is an elevation of another embodiment with parts removed.

In the embodiment of Figures 1 through 5, four toothed-cylinders and two brush-cylinders are used. They are also positioned with each of the toothed-cylinders and each of the brush-cylinders in a row directly above one another. However, it is desirable in some instances, especially where a machine of larger capacity is needed, to provide a greater number of toothed-cylinders and brush-cylinders. In this case, an arrangement of parts corresponding to the diagrammatic showing of Figure 9 is preferred. In this embodiment, eight toothed-cylinders 100, four brush-cylinders 101, and a kicker 102 are employed. Also, the toothed-cylinders and brush-cylinders are arranged in rows on the arcs of circles concave toward the feed-belt. This matches better in shape with the roll of whirling cotton, with less tendency of the cotton roll adjacent the upper toothed-cylinders to be pulled away from them. Other parts, such as 44, 36, and 65, are similar in structure and function to the corresponding numbered parts of the embodiment of Figures 1 to 6.

Having thus described the invention, what is claimed is:

1. A cotton-working machine comprising a plurality of rotatable cylinders mounted adjacent each other with horizontally positioned axes of rotation and all rotatable in the same direction, the cylinders being positioned one above the other in a row, each cylinder having teeth on its periphery, a horizontally movable feed-belt for moving lumps of cotton into engagement with the lowermost cylinder, whereby its teeth engage into the lump and remove a portion of cotton as lint and carry the lump into engagement with the next adjacent higher cylinder, a deflector plate positioned above the cylinders and feed-belt to direct lumps of cotton back onto the feed-belt, a kicker positioned adjacent the uppermost cylinder for engaging the cotton lumps as they leave the uppermost cylinder and directing them into engagement with the deflector plate, whereby a roll of lumpy cotton continuously rotates in the machine, and means for removing the lint from between the teeth.

2. The subject-matter of claim 1 characterized in that the feed-belt is perforated to provide for egress of debris contained in the cotton lumps.

3. The subject-matter of claim 1 characterized in that the axes of rotation of the cylinders are positioned substantially on the arc of a circle concave toward the feed-belt.

CLARENCE M. ASBILL, Jr.
RAY C. YOUNG.